(12) United States Patent
Liu et al.

(10) Patent No.: US 10,203,960 B2
(45) Date of Patent: Feb. 12, 2019

(54) RECONFIGURABLE PROCESSOR AND CONDITIONAL EXECUTION METHOD FOR THE SAME

(71) Applicant: Tsinghua University, Beijing (CN)

(72) Inventors: Leibo Liu, Beijing (CN); Jianfeng Zhu, Beijing (CN); Xiao Yang, Beijing (CN); Shouyi Yin, Beijing (CN); Shaojun Wei, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 123 days.

(21) Appl. No.: 15/119,716

(22) PCT Filed: Feb. 20, 2014

(86) PCT No.: PCT/CN2014/072334
§ 371 (c)(1),
(2) Date: Aug. 17, 2016

(87) PCT Pub. No.: WO2015/123848
PCT Pub. Date: Aug. 27, 2015

(65) Prior Publication Data
US 2017/0052786 A1     Feb. 23, 2017

(51) Int. Cl.
  *G06F 9/30* (2018.01)
  *G06F 9/38* (2018.01)
(52) U.S. Cl.
  CPC ........ *G06F 9/30058* (2013.01); *G06F 9/3001* (2013.01); *G06F 9/30072* (2013.01); *G06F 9/3885* (2013.01)
(58) Field of Classification Search
  None
  See application file for complete search history.

(56) References Cited

U.S. PATENT DOCUMENTS 5,361,367 A * 11/1994 Fijany .................. G06F 15/8015
                                                      712/13
5,802,385 A *  9/1998 Densham ............... H04H 60/04
                                                      712/16
(Continued)

FOREIGN PATENT DOCUMENTS

CN           1250910 A      4/2000
CN         101111818 A      1/2008
(Continued)

OTHER PUBLICATIONS

China Patent Office, Office action from SIPO for CN application 201410058606.0, which is a China counterpart application of the present US patent applicaion, dated Dec. 7, 2015.
(Continued)

*Primary Examiner* — Eric Coleman
(74) *Attorney, Agent, or Firm* — Houtteman Law LLC

(57) ABSTRACT

A reconfigurable processor and a conditional execution method for the same are provided. The reconfigurable processor includes: a routing unit, configured to assign a conditional judgment statement and a conditional execution statement to process the conditional judgment statement and the conditional execution statement in parallel; a first arithmetic logic unit, configured to process the conditional judgment statement according to an assignment of the routing unit to obtain a single-bit signal; a second arithmetic logic unit, configured to: process the conditional execution statement according to the assignment of the routing unit to obtain a conditional execution result; receive the single-bit signal; and control an output of the conditional execution result according to the single-bit signal. The reconfigurable processor according to embodiments of the present disclosure may reduce a dependence distance and a running time of the conditional branch statement and enhance an execution efficiency of the conditional branch statement by (Continued)

executing the conditional judgment statement and the conditional execution statement in parallel.

12 Claims, 2 Drawing Sheets

(56) References Cited

U.S. PATENT DOCUMENTS

| | | | |
|---|---|---|---|
| 6,260,135 B1 | 7/2001 | Toshiba | |
| 7,707,387 B2* | 4/2010 | Bittner, Jr. | G06F 9/30058 |
| | | | 712/201 |
| 2004/0039900 A1 | 2/2004 | Heishi | |
| 2005/0257024 A1* | 11/2005 | Ray | G06F 9/3001 |
| | | | 712/11 |
| 2014/0019726 A1* | 1/2014 | Toi | G06F 9/3001 |
| | | | 712/221 |

FOREIGN PATENT DOCUMENTS

| | | |
|---|---|---|
| CN | 101189573 A | 5/2008 |
| CN | 101689107 A | 3/2010 |
| CN | 102707927 A | 10/2012 |
| CN | 103853526 A | 6/2014 |

OTHER PUBLICATIONS

WIPO, International search report and written opinions for PCT application PCT/CN2014/072334, dated Nov. 26, 2014.

* cited by examiner

RECONFIGURABLE PROCESSOR AND CONDITIONAL EXECUTION METHOD FOR THE SAME

TECHNICAL FIELD

Embodiments of the present invention generally relate to a field of computer technology, and more particularly, to a reconfigurable processor and a conditional execution method for a reconfigurable processor.

BACKGROUND

A reconfigurable processor, having a significant advantage compared with a conventional single-core processor, an ASIC (Application Specific Integrated Circuit) and a field programmable logic array, is a new parallel processor and is a development direction of a circuit structure in the future. The reconfigurable processor often contains a plurality of arithmetic logic units which may be called a multi-core array. A routing unit with a high flexibility may be configured in the multi-core array to realize a diversity of interconnections of the plurality of arithmetic logic units. Therefore, the multi-core array connected by the routing unit may realize a high speed processing of data streams, and may have a tremendous advantage over the conventional single-core processor or a processor with a few cores in the performance. At the same time, the multi-core array has a tremendous advantage over a cured dedicated circuit in the flexibility.

Conditional branch statements refer to code statements in the form of IF-ELSE and consist of conditional judgment statements and conditional execution statements. The conditional execution statements may be divided into a plurality of mutually exclusive branches, and one of the plurality of mutually exclusive branches may be selected to be executed according to results of the conditional judgment statements. In a conventional general processor, an execution efficiency of the conditional branch statements has great impact on the overall performance. Currently, there are two main execution methods for executing the conditional branch statements: a branch prediction and a conditional execution.

In the conventional general processor which does not support the branch prediction, subsequent instructions need to be loaded when the results of the conditional judgment statements are not yet calculated, thus an assembly line of the processor may be blocked by control dependencies caused by the conditional branches. There are a few computing resources for the conventional general processor, so the branch prediction technology may predict that one of the plurality of branches is correct and this branch may be executed in advance. If the branch is successfully predicted, the assembly line will skip the control dependencies perfectly, but once the branch is incorrectly predicted, the assembly line may be cleared, which is more costly than blocking the assembly line. In addition, instructions executed in advance are not secure, and results of these instructions cannot change a system state (writing into a system register or sharing a memory) before the results of the conditional judgment statements are calculated.

The conditional execution is a method for converting the control dependencies into data dependencies. The control dependencies may be eliminated by the conditional execution, however, like the branch prediction, the conditional judgment statements need to be executed in advance, and the results of the instructions executed in advance cannot change the system state before the results of the conditional judgment statements are calculated.

SUMMARY

Embodiments of the present invention seek to solve problems existing in the related art to at least some extent.

Accordingly, a first objective of the present disclosure is to provide a reconfigurable processor, which may reduce the dependence distance and the running time of a conditional branch statement and greatly enhance an execution efficiency of the conditional branch statement.

A second objective of the present disclosure is to provide a conditional execution method for a reconfigurable processor.

A third objective of the present disclosure is to provide an application program.

A fourth objective of the present disclosure is to provide a storage medium.

In order to achieve above objectives, according to embodiments of a first aspect of the present disclosure, there is provided a reconfigurable processor, including: a routing unit, configured to assign a conditional judgment statement and a conditional execution statement of a conditional branch statement to process the conditional judgment statement and the conditional execution statement in parallel; a first arithmetic logic unit, configured to process the conditional judgment statement according to an assignment of the routing unit to obtain a single-bit signal; a second arithmetic logic unit, configured to: process the conditional execution statement according to the assignment of the routing unit to obtain a conditional execution result; receive the single-bit signal; and control an output of the conditional execution result according to the single-bit signal.

With the reconfigurable processor according to embodiments of the present disclosure, the conditional judgment statement and the conditional execution statement may be processed in parallel by two arithmetic logic units respectively, and the output of the conditional execution result obtained by processing the conditional execution statement may be controlled according to the single-bit signal obtained by processing the conditional judgment statement, such that the conditional branch statement may be executed in a same clock cycle. In this way, control dependencies may be converted into data dependencies, the dependence distance and the running time of the conditional branch statement may be reduced, and the conditional branch statement may be realized directly by a way of hardware connection, further, an execution efficiency of the conditional branch statement may be enhanced greatly.

In an embodiment of the present invention, the second arithmetic logic unit includes: a calculating unit, configured to process the conditional execution statement of the conditional branch statement in parallel to obtain the conditional execution result when the first arithmetic logic unit executes the conditional judgment statement; a rapid condition input port, configured to receive the single-bit signal outputted by the first arithmetic logic unit; a data output port, configured to output the conditional execution result; a control port, configured to control a validity of the data output port according to the single-bit signal.

In an embodiment of the present invention, the control port is configured to control a validity of the data output port according to the single-bit signal by steps of: controlling by the control port the data output port to be valid if the single-bit signal is 1 such that the data output port outputs the conditional execution result; controlling by the control port the data output port to be invalid if the single-bit signal is 0.

In an embodiment of the present invention, the output of the conditional execution result includes writing the conditional execution result into a memory and/or sending the conditional execution result to the routing unit.

In order to achieve the above objectives, according to embodiments of a second aspect of the present disclosure, there is provided a conditional execution method for a reconfigurable processor, including: processing a conditional judgment statement and a conditional execution statement of a conditional branch statement in parallel to obtain a single-bit signal according to the conditional judgment statement and a conditional execution result according to the conditional execution statement respectively; controlling an output of the conditional execution result according to the single-bit signal.

With the conditional execution method for a reconfigurable processor according to embodiments of the present disclosure, the conditional judgment statement and the conditional execution statement may be processed in parallel, and the output of the conditional execution result obtained by processing the conditional execution statement may be controlled according to the single-bit signal obtained by processing the conditional judgment statement, such that the conditional branch statement may be executed in a same clock cycle. In this way, control dependencies may be converted into data dependencies, the dependence distance and the running time of the conditional branch statement may be reduced, and the conditional branch statement may be realized directly by a way of hardware connection, further, an execution efficiency of the conditional branch statement may be enhanced greatly.

In an embodiment of the present invention, processing a conditional judgment statement and a conditional execution statement of a conditional branch statement in parallel includes: assigning the conditional judgment statement and the conditional execution statement respectively to two arithmetic logic units so as to process the conditional judgment statement and the conditional execution statement respectively in a same clock cycle.

In an embodiment of the present invention, controlling an output of the conditional execution result according to the single-bit signal includes: outputting the conditional execution result if the single-bit signal is 1; not outputting the conditional execution result if the single-bit signal is 0.

In an embodiment of the present invention, the output of the conditional execution result includes writing the conditional execution result into a memory and/or sending the conditional execution result to a routing unit.

In order to achieve above objectives, according to embodiments of a third aspect of the present disclosure, there is provided an application program, configured to execute the conditional execution method for a reconfigurable processor according to embodiments of the second aspect of the present disclosure, when run.

In order to achieve the above objectives, according to embodiments of a fourth aspect of the present disclosure, there is provided a storage medium, configured to store an application program that, when run, executes the conditional execution method for a reconfigurable processor according to embodiments of the second aspect of the present disclosure.

Additional aspects and advantages of embodiments of present invention will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present invention will become apparent and more readily appreciated from the following descriptions made with reference to the accompanying drawings, in which.

DETAILED DESCRIPTION

Figure 1:
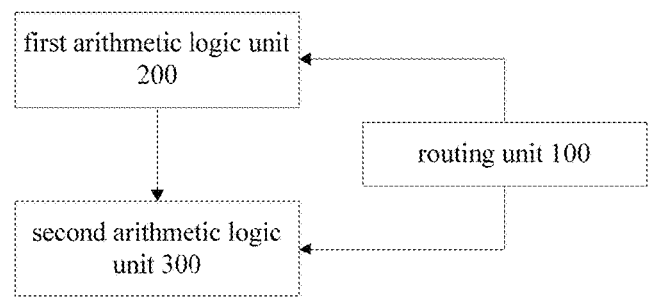
FIG. 1 is a block diagram of a reconfigurable processor according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

Currently, an efficiency of an execution method for a conditional branch statement is relatively low, therefore, a conditional judgment statement and a conditional execution statement of the conditional branch statement may be processed in parallel by a plurality of arithmetic logic units in a reconfigurable processor, and an output of a conditional execution result obtained by processing the conditional execution statement may be controlled according to a single-bit signal obtained by processing the conditional judgment statement, such that the execution efficiency of the conditional branch statement may be enhanced. In the following, a reconfigurable processor and a conditional execution method for a reconfigurable processor according to an embodiment of the present disclosure will be described with reference to accompanying drawings.

FIG. 1 is the block diagram of a reconfigurable processor according to an embodiment of the present disclosure.

As shown in FIG. 1, the reconfigurable processor according to an embodiment of the present disclosure includes a routing unit 100, a first arithmetic logic unit 200 and a second arithmetic logic unit 300.

Specifically, the routing unit 100 is configured to assign a conditional judgment statement and a conditional execution statement of a conditional branch statement to process the conditional judgment statement and the conditional execution statement in parallel. In embodiments of the present disclosure, the conditional judgment statement and the conditional execution statement of the conditional branch statement may be assigned by the routing unit 100 according to configuration information of the reconfigurable processor to the first arithmetic logic unit 200 and the second arithmetic logic unit 300 respectively so as to be processed. The configuration information of the reconfigurable processor may include information of instruction streams for configuring the arithmetic logic units and information of non instruction streams for configuring the routing units connected with each other, furthermore, the routing unit 100 may couple the mutually independent instructions in the instruction streams (a relationship of a generation and consumption).

The first arithmetic logic unit 200 is configured to process the conditional judgment statement according to an assignment of the routing unit 100 to obtain a single-bit signal.

The second arithmetic logic unit 300 is configured to process the conditional execution statement according to the assignment of the routing unit 100 to obtain a conditional execution result, to receive the single-bit signal, and to control an output of the conditional execution result according to the single-bit signal. In an embodiment of the present disclosure, the second arithmetic logic unit 300 includes a calculating unit, a rapid condition input port, a data output port and a control port. The calculating unit is configured to process the conditional execution statement of the conditional branch statement in parallel to obtain the conditional execution result when the first arithmetic logic unit executes the conditional judgment statement; the rapid condition input port is configured to receive the single-bit signal outputted by the first arithmetic logic unit; the data output port is configured to output the conditional execution result; the control port is configured to control a validity of the data output port according to the single-bit signal.

Figure 2:
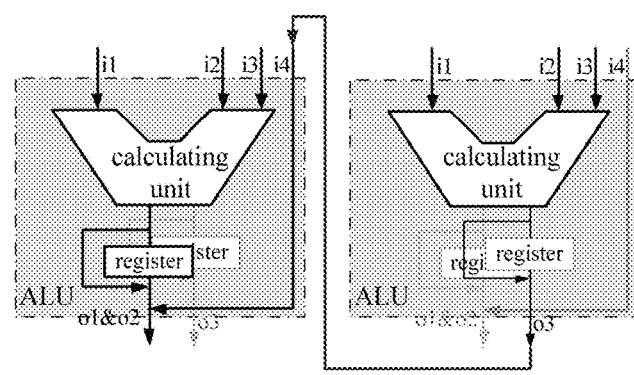
FIG. 2 is a schematic diagram of a first arithmetic logic unit and a second arithmetic logic unit according to an embodiment of the present disclosure working.

FIG. 2 is the schematic diagram of a first arithmetic logic unit and a second arithmetic logic unit according to an embodiment of the present disclosure working. Specifically, as shown in FIG. 2, i1 and i2 are data output ports, i3 is a conventional condition execution control input port, and i4 is the rapid condition input port provided by embodiments of the present disclosure. After the first arithmetic logic unit 200 executes the conditional judgment statement and the second arithmetic logic unit 300 executes the conditional execution statement, the first arithmetic logic unit 200 may output the single-bit signal through an output port o3 of the first arithmetic logic unit 200. The single-bit signal is inputted into the second arithmetic logic unit 300 through the rapid condition input port i4 of the second arithmetic logic unit 300 and then the single-bit signal directly reaches a control port o1 of the second arithmetic logic unit 300 for controlling the validity of the data output port without passing through the calculating unit of the second arithmetic logic unit 300. If the single-bit signal inputted into the rapid condition input port i4 is 0, an output port o2 of the second arithmetic logic unit 300 is controlled to be invalid, and the conditional execution result cannot be inputted into a memory or into the routing unit 100. If the single-bit signal inputted into the rapid condition input port i4 is 1, the output port o2 of the second arithmetic logic unit 300 is controlled to be valid, and the conditional execution result can be output via the output port o2, that is, the conditional execution result may be wrote into the memory and/or be sent to the routing unit 100.

Figure 3:
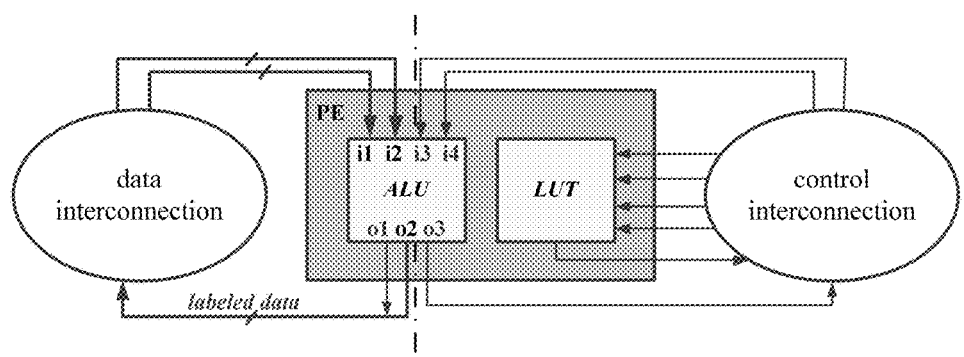
FIG. 3 is a schematic diagram illustrating that a reconfigurable processor performs a conditional execution according to an embodiment of the present disclosure.

FIG. 3 is the schematic diagram illustrating that a reconfigurable processor performs a conditional execution according to an embodiment of the present disclosure. Specifically, as shown in FIG. 3, the arithmetic logic unit may receive data to be processed via a data bus, and receive a control signal via a control bus. In FIG. 3, i1 and i2 are data output ports, i3 is a conventional condition execution control input port, i4 is the rapid condition input port provided by embodiments of the present disclosure, and o1 is a control port configured to control a validity of the data output port o2. After o3 receives the control signal, the conditional execution statement is required to be executed by the calculating unit such that the conditional execution result may be outputted via the data output port o2, and when the rapid condition input port i4 receives the control signal, the conditional execution statement is executed by the calculating unit within a last clock cycle such that control signal received by the rapid condition input port i4 may be transmitted to the control port o1 directly to control the output of the conditional execution result, therefore, a time delay from the rapid condition input port i4 to the control port o1 is much shorter than that from the conventional condition execution control input port i3 to the control port o1 such that the conditional execution can be completed more quickly.

With the reconfigurable processor according to embodiments of the present disclosure, the conditional judgment statement and the conditional execution statement may be processed in parallel by two arithmetic logic units respectively, and the output of the conditional execution result obtained by processing the conditional execution statement may be controlled according to the single-bit signal obtained by processing the conditional judgment statement, such that the conditional branch statement may be executed in a same clock cycle. In this way, control dependencies may be converted into data dependencies, the dependence distance and the running time of the conditional branch statement may be reduced, and the conditional branch statement may be realized directly by a way of hardware connection, further, an execution efficiency of the conditional branch statement may be enhanced greatly.

It should be understood that, the reconfigurable processor contains a plurality of arithmetic logic units capable of computing in parallel, and these arithmetic logic units may be called a multi-core array. In an embodiment of the present disclosure, the first arithmetic logic unit and the second arithmetic logic unit may be any two arithmetic logic units in the multi-core array of the reconfigurable processor. In addition, "first" and "second" are used herein for purposes of description. In other embodiments of the present disclosure, the first arithmetic logic unit may also be used to process the conditional execution statement, and to receive the single-bit signal obtained according to the result of processing the conditional judgment statement by any other arithmetic logic unit in the multi-core array so as to control the output of the conditional execution result according to the single-bit signal; the second arithmetic logic unit may also be used to process the conditional judgment statement, and to output the single-bit signal to any other arithmetic logic unit in the multi-core array, such that the output of the conditional execution result may be controlled according to the single-bit signal. In an embodiment of the present disclosure, the single-bit signal may be outputted to an arithmetic logic unit which processes the conditional execution statement corresponding to the single-bit signal according to a control of the routing unit.

In order to realize the above embodiments, embodiments of the present disclosure also provide a conditional execution method for a reconfigurable processor.

Figure 4:
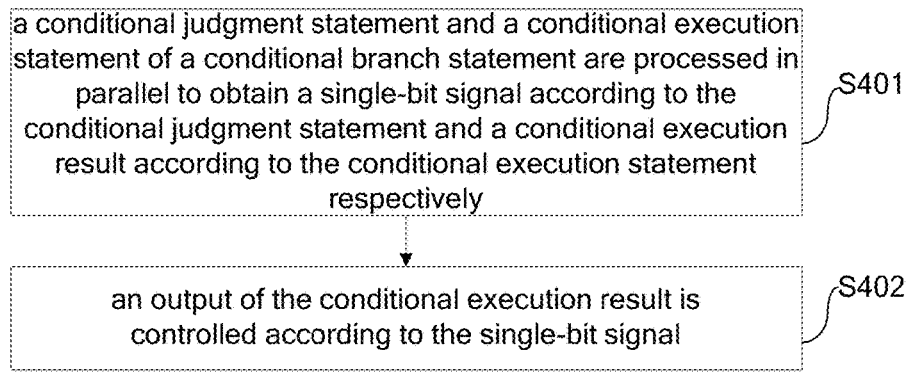
FIG. 4 is a flow chart of a conditional execution method for a reconfigurable processor according to an embodiment of the present disclosure.

FIG. 4 is the flow chart of a conditional execution method for a reconfigurable processor according to an embodiment of the present disclosure. Specifically, as shown in FIG. 4, the conditional execution method for a reconfigurable processor includes following steps.

In step S401, a conditional judgment statement and a conditional execution statement of a conditional branch statement are processed in parallel to obtain a single-bit signal according to the conditional judgment statement and a conditional execution result according to the conditional execution statement respectively.

In an embodiment of the present disclosure, the conditional judgment statement and the conditional execution statement may be assigned respectively to two arithmetic logic units respectively such that the conditional judgment statement and the conditional execution statement may be processed respectively in a same clock cycle.

In step S402, an output of the conditional execution result is controlled according to the single-bit signal.

In embodiments of the present disclosure, the conditional execution result is outputted (i.e. the conditional execution result is wrote into a memory and/or sent to a routing unit) if the single-bit signal is 1; the conditional execution result is not outputted if the single-bit signal is 0.

With the conditional execution method for a reconfigurable processor according to embodiments of the present disclosure, the conditional judgment statement and the conditional execution statement may be processed in parallel, and the output of the conditional execution result obtained by processing the conditional execution statement may be controlled according to the single-bit signal obtained by processing the conditional judgment statement, such that the conditional branch statement may be executed in a same clock cycle. In this way, control dependencies may be converted into data dependencies, the dependence distance and the running time of the conditional branch statement may be reduced, and the conditional branch statement may be realized directly by a way of hardware connection, further, an execution efficiency of the conditional branch statement may be enhanced greatly.

Figure 5:
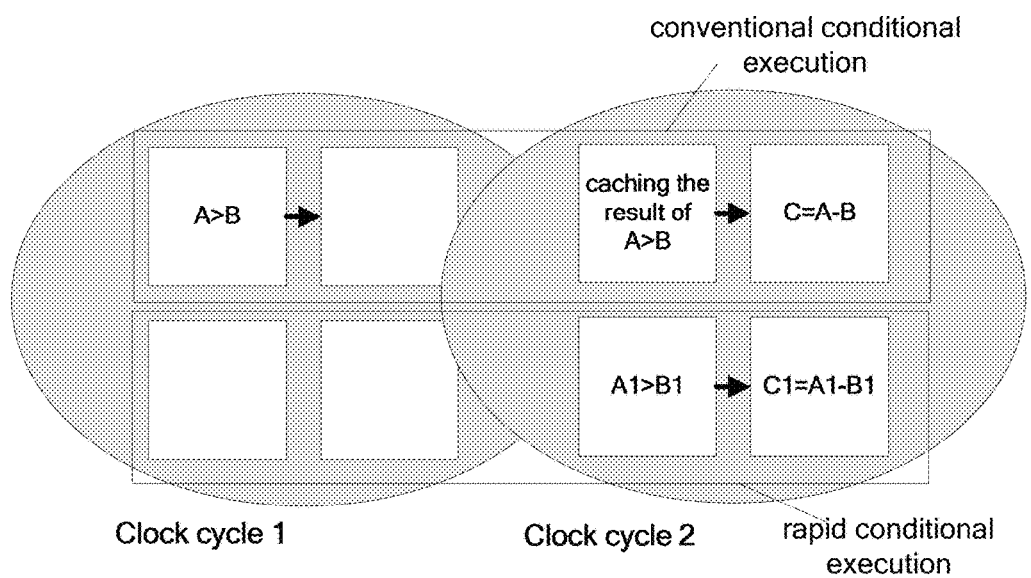
FIG. 5 is a schematic diagram of a comparison of a conditional execution performed by a reconfigurable processor according to an embodiment of the present disclosure and by a conventional conditional execution.

FIG. 5 is the schematic diagram of a comparison of a conditional execution performed by a reconfigurable processor according to an embodiment of the present disclosure and by a conventional conditional execution. As shown in FIG. 5, the conditional branch statement IF (A>B), C=A−B may be processed in a 2×2 reconfigurable processor. In the conventional conditional execution, it takes two clock cycles (the clock cycle 1 and the clock cycle 2) to execute the conditional branch statement. But in the rapid conditional execution according to embodiments of the present disclosure, it just takes one clock cycle (the clock cycle 2) to execute the conditional branch statement. Thus, with the conditional execution method for a reconfigurable processor according to embodiments of the present disclosure, the running time of the conditional branch statement may be reduced and the execution efficiency of the conditional branch statement may be enhanced.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in a almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present invention may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A reconfigurable processor, comprising:
   a routing unit, configured to assign a conditional judgment statement and a conditional execution statement of a conditional branch statement to process the conditional judgment statement and the conditional execution statement in parallel;
   a first arithmetic logic unit, configured to process the conditional judgment statement according to an assignment of the routing unit to obtain a single-bit signal;
   a second arithmetic logic unit, configured to:
   process the conditional execution statement according to the assignment of the routing unit to obtain a conditional execution result;
   receive the single-bit signal; and
   control an output of the conditional execution result according to the single-bit signal,
   wherein the first arithmetic logic unit is configured to output the single-bit signal to an input port of the second arithmetic logic unit for controlling validity of the conditional execution result without passing through a calculating unit of the second arithmetic logic unit.

2. The reconfigurable processor according to claim 1, wherein the second arithmetic logic unit comprises:
   the calculating unit, configured to process the conditional execution statement of the conditional branch statement in parallel to obtain the conditional execution result when the first arithmetic logic unit executes the conditional judgment statement;
   a rapid condition input port, configured to receive the single-bit signal outputted by the first arithmetic logic unit;
   a data output port, configured to output the conditional execution result;
   a control port, configured to control a validity of the data output port according to the single-bit signal.

3. The reconfigurable processor according to claim 1, wherein the control port is configured to control a validity of the data output port according to the single-bit signal by steps of:
   controlling by the control port the data output port to be valid if the single-bit signal is 1 such that the data output port outputs the conditional execution result;
   controlling by the control port the data output port to be invalid if the single-bit signal is 0.

4. The reconfigurable processor according to claim 1, wherein the output of the conditional execution result comprises writing the conditional execution result into a memory and/or sending the conditional execution result to the routing unit.

5. A conditional execution method for a reconfigurable processor, comprising:
   processing a conditional judgment statement and a conditional execution statement of a conditional branch statement in parallel to obtain a single-bit signal according to the conditional judgment statement and a conditional execution result according to the conditional execution statement respectively;
   controlling an output of the conditional execution result according to the single-bit signal, wherein the single-bit signal is configured to control validity of the conditional execution result directly without through calculating.

6. The conditional execution method according to claim 5, wherein processing a conditional judgment statement and a conditional execution statement of a conditional branch statement in parallel comprises:
   assigning the conditional judgment statement and the conditional execution statement respectively to two arithmetic logic units so as to process the conditional judgment statement and the conditional execution statement respectively in a same clock cycle.

7. The conditional execution method according to claim 5, wherein controlling an output of the conditional execution result according to the single-bit signal comprises:
   outputting the conditional execution result if the single-bit signal is 1;
   not outputting the conditional execution result if the single-bit signal is 0.

8. The conditional execution method according to claim 5, wherein the output of the conditional execution result comprises:
   writing the conditional execution result into a memory and/or sending the conditional execution result to a routing unit.

9. A non-transitory storage medium, configured to store an application program that, when run, executes a conditional execution method for a reconfigurable processor, the method comprising:
   processing a conditional judgment statement and a conditional execution statement of a conditional branch statement in parallel to obtain a single-bit signal according to the conditional judgment statement and a conditional execution result according to the conditional execution statement respectively;

controlling an output of the conditional execution result according to the single-bit signal, wherein the single-bit signal is configured to control validity of the conditional execution result directly without through calculating.

10. The non-transitory storage medium according to claim 9, wherein processing a conditional judgment statement and a conditional execution statement of a conditional branch statement in parallel comprises:

assigning the conditional judgment statement and the conditional execution statement respectively to two arithmetic logic units so as to process the conditional judgment statement and the conditional execution statement respectively in a same clock cycle.

11. The non-transitory storage medium according to claim 9, wherein controlling an output of the conditional execution result according to the single-bit signal comprises:

outputting the conditional execution result if the single-bit signal is 1;

not outputting the conditional execution result if the single-bit signal is 0.

12. The non-transitory storage medium according to claim 9, wherein the output of the conditional execution result comprises:

writing the conditional execution result into a memory and/or sending the conditional execution result to a routing unit.

* * * * *